United States Patent [19]

Aoki et al.

[11] Patent Number: 4,987,185

[45] Date of Patent: Jan. 22, 1991

[54] IMPACT RESISTANT THERMOPLASTIC RESIN COMPOSITION

[75] Inventors: Yuji Aoki; Makoto Watanabe, both of Yokkaichi, Japan

[73] Assignee: Monsanto Kasei Company, Tokyo, Japan

[21] Appl. No.: 365,430

[22] Filed: Jun. 13, 1989

[30] Foreign Application Priority Data

Jun. 17, 1988 [JP]  Japan ................................ 63-149840

[51] Int. Cl.$^5$ .............................................. C08L 77/00
[52] U.S. Cl. ...................................... 525/66; 525/179
[58] Field of Search ................................... 525/66, 179

[56] References Cited

FOREIGN PATENT DOCUMENTS 58-71952   4/1983   Japan ..................................... 525/179
62-22844   1/1987   Japan ....................................... 525/66

*Primary Examiner*—Ana L. Carrillo
*Attorney, Agent, or Firm*—Oblon, Spivak, McClelland, Maier & Neustadt

[57] ABSTRACT

An impact resistant thermoplastic resin composition which comprises:

100 parts by weight of a resin mixture comprising from 20 to 80% by weight of a polyamide resin (A) and from 20 to 80% by weight of a graft copolymer (B) composed of from 40 to 60 parts by weight of a conjugated diene rubber and from 40 to 60 parts by weight of a monomer mixture comprising from 60 to 80% by weight of an aromatic vinyl monomer component and from 20 to 40% by weight of a vinyl cyanide monomer component (provided that the total amount of said monomer mixture is 100% by weight) wherein the average particle size of graft rubber is from 0.2 to 1.0 μm, the graft ratio is from 40 to 80%, and the specific viscosity of a resinous component composed of said monomer components is from 0.05 to 0.10;

from 0.01 to 40 parts by weight of a copolymer (C) comprising from 50 to 80% by weight of an aromatic vinyl monomer component, from 0.01 to 30% by weight of an α,β-unsaturated dicarboxylic anhydride monomer component, from 5 to 47% by weight of at least one monomer component selected from the group consisting of an N-substituted maleimide monomer component and a vinyl cyanide monomer component, and from 0 to 30% by weight of a methyl methacrylate monomer component (provided that the total amount of the monomer components is 100% by weight); and from 0 to 15 parts by weight of a copolymer (D) comprising from 60 to 90% by weight of an aromatic vinyl monomer component, from 0 to 40% by weight of a vinyl cyanide monomer component and from 0 to 40% by weight of a methyl methacrylate monomer component (provided that the total amount of the monomer components is 100% by weight).

12 Claims, 1 Drawing Sheet

FIGURE 1

IMPACT RESISTANT THERMOPLASTIC RESIN COMPOSITION

The present invention relates to an impact resistant thermoplastic resin composition. More particularly, it relates to a resin composition obtained by incorporating a certain specific copolymer containing an α, β-unsaturated dicarboxylic anhydride monomer component to a resin mixture comprising a polyamide resin and a certain specific rubber-modified styrene graft copolymer, which is capable of providing a molded product having excellent impact resistance, particularly excellent notched Izod impact strength at low temperatures.

Polyamide resins have excellent abrasion resistance, electrical properties, mechanical strength and chemical resistance. Therefore, their molded products have been used for various mechanical parts as engineering plastics. However, they have drawbacks such as large water absorbance, low impact resistance, particularly low notched impact strength. Further, they also have drawbacks that they are inferior in heat resistance under a high load or in moldability because they are crystalline resins.

Since the polyamide resins have such drawbacks, their use as engineering plastics is limited, and in some cases, their excellent properties can not be adequately utilized.

In order to overcome these drawbacks of the polyamide resins, for example, it has been proposed to mix an acrylonitrile-butadiene-styrene copolymer (ABS resin) to a polyamide resin to obtain a blend resin composition (e.g. Japanese Examined Pat. Publication No. 23476/1963). However, such a blend resin composition of a polyamide resin with an ABS resin is inferior in the compatibility, and when formed into a molded product, it brings about drawbacks such that a lamellar peeling phenomenon is likely to result due to inadequate compatibility, and the mechanical strength such as tensile strength is likely to substantially deteriorate. Under the circumstances, as a method for improving the compatibility of the polyamide resin with a styrene-type polymer such as an ABS resin, it has been proposed to incorporate a styrene-type polymer containing an α, β-unsaturated carboxylic anhydride component as a third component to the blend resin composition composed of both resins (e.g. Japanese Examined Pat. Publication No. 47304/1985). By the incorporation of this third component, it is certainly possible to obtain a blend resin composition wherein the polyamide resin and the styrene-type polymer are physically finely dispersed. However, no substantial improvement in the impact resistance is obtainable with such a three component resin composition.

Further, it has been proposed to incorporate as a third component a copolymer resin containing an N-substituted maleimide monomer component (e.g. Japanese Examined Pat. Publication No. 60098/1986 and Japanese Unexamined Pat. Publication No. 57452/1987). By the incorporation of such a third component, it is possible in some cases to obtain a composition having excellent impact resistance at about room temperature, but it is impossible to obtain a composition having excellent impact resistance at a low temperature.

As described in the foregoing, among the conventional resin compositions composed of a polyamide resin and a styrene-type polymer, there has been no resin material which has not only excellent properties of both resins but also excellent impact resistance at a low temperature.

The present inventors have conducted extensive research with an aim to overcome the above-mentioned various drawbacks inherent to the conventional resin compositions comprising a polyamide resin and a rubber-modified styrene-type graft copolymer and have finally arrived at the present invention. Namely, it is an object of the present invention to provide a resin composition capable of providing a molded product having excellent heat resistance and impact resistance, particularly remarkably improved impact resistance at a low temperature, by blending a certain specific copolymer containing an α, β-unsaturated dicarboxylic anhydride monomer component to a resin mixture comprising a polyamide resin and a certain specific rubber-modified styrene graft copolymer.

The present invention provides an impact resistant thermoplastic resin composition which comprises:

100 parts by weight of a resin mixture comprising from 20 to 80% by weight of a polyamide resin (A) and from 20 to 80% by weight of a graft copolymer (B) composed of from 40 to 60 parts by weight of a conjugated diene rubber and from 40 to 60 parts by weight of a monomer mixture comprising from 60 to 80% by weight of an aromatic vinyl monomer component and from 20 to 40% by weight of a vinyl cyanide monomer component (provided that the total amount of said monomer mixture is 100% by weight) wherein the average particle size of graft rubber is from 0.2 to 1.0 μm, the graft ratio is from 40 to 80%, and the specific viscosity of a resinous component composed of said monomer components is from 0.05 to 0.10;

from 0.01 to 40 parts by weight of a copolymer (C) comprising from 50 to 80% by weight of an aromatic vinyl monomer component, from 0.01 to 30% by weight of an α, β-unsaturated dicarboxylic anhydride monomer component, from 5 to 47% by weight of at least one monomer component selected from the group consisting of maleimide, an N-substituted maleimide monomer component and a vinyl cyanide monomer component, and from 0 to 30% by weight of a methyl methacrylate monomer component (provided that the total amount of the monomer components is 100% by weight); and from 0 to 15 parts by weight of a copolymer (D) comprising from 60 to 90% by weight of an aromatic vinyl monomer component, from 0 to 40% by weight of a vinyl cyanide monomer component and from 0 to 40% by weight of a methyl methacrylate monomer component (provided that the total amount of the monomer components is 100% by weight).

In the accompanying drawing.

Now, the present invention will be described in detail.

The polyamide resin (A) constituting the resin composition of the present invention is an injection-moldable conventional nylon-type thermoplastic resin. Specific examples of such polyamide resin (A) include nylons called by common names such as nylon 6, nylon 66, copolymer nylon (copolymer of caprolactam with hexamethylenediamine adipate), nylon 610, nylon 612, nylon 11, nylon 12 and nylon MXD6 (condensation polymer of m-xylylenediamine with adipic acid) and copolymers comprising these nylons as main components, and mixtures thereof. Among them, nylon 6, nylon 66 or a copolymer nylon, or a mixture thereof is particularly preferred.

The graft copolymer (B) constituting the resin composition of the present invention is composed of from 40 to 60 parts by weight of a conjugated diene rubber and from 40 to 60 parts by weight of a monomer mixture comprising from 60 to 80% by weight of an aromatic vinyl monomer component and from 20 to 40% by weight of a vinyl cyanide monomer component. The average particle size of graft rubber in the graft copolymer (B) is from 0.2 to 1.0 μm, the graft ratio is from 40 to 80%, and the specific viscosity of the resinous component of the terminal graft portions composed of the above monomer components is from 0.05 to 0.10. In this graft copolymer (B), the content of the conjugated diene rubber, the average particle size of the graft rubber, the graft ratio and the specific viscosity of the resinous component are optimized, and when blended with the polyamide resin (A), it serves as an impact modifier (impact resistance-imparting agent).

In order to let the graft copolymer (B) function effectively as an impact modifier in the resin composition of the present invention particularly at a low temperature, it is necessary that the average particle size of graft rubber in the graft copolymer (B) is selected within a range of from 0.2 to 1.0 μm, the graft ratio is selected within a range of from 40 to 80%, and the specific viscosity of the resinous component of the terminal graft portions is selected within a range of from 0.05 to 0.10. Outside these ranges, no adequate effect will be obtained for the improvement of the physical properties such as the impact resistance at a low temperature of the resin composition of the present invention.

The conjugated diene rubber as a component constituting the graft copolymer (B) is a rubbery polymer containing at least 50% by weight of a conjugated diene monomer component such as butadiene, isoprene or chloroprene and having a glass transition temperature of not higher than 0° C. Specific examples of such a conjugated diene rubber include known synthetic rubbers such as butadiene rubber (BR), styrene-butadiene rubber (SBR), acrylonitrile-butadiene rubber (NBR) and isoprene rubber (IR).

This conjugated diene rubber is supplied in the form of a rubber latex or a solid rubber and will be used in the state of an emulsion or solution depending upon the process for the preparation of the graft copolymer (B).

Specific examples of the aromatic vinyl monomer component as a component of the above monomer mixture constituting the graft copolymer (B) include styrene, an α-alkylstyrene such as α-methylstyrene, a ring-substituted alkylstyrene such as p-methylstyrene and vinyl naphthalene. These monomers may be used alone or in combination as a mixture of two or more. The proportion of the aromatic vinyl monomer component in the monomer mixture is from 6 to 80% by weight. If the proportion is outside this range, the properties of the graft copolymer (B), such as the impact resistance and the compatibility with other resins tend to change, whereby it will be difficult to obtain a resin composition having excellent physical properties.

Specific examples of the vinyl cyanide monomer component as a component of the above monomer mixture constituting the graft copolymer (B) include acrylonitrile, methacrylonitrile and α-chloroacrylonitrile. These monomers may be used alone or in combination as a mixture of two or more.

The proportion of the vinyl cyanide monomer component in the monomer mixture is from 20 to 40% by weight. If the proportion is outside this range, the properties of the graft copolymer (B), such as the impact resistance and the compatibility with other resins, tend to change, whereby it will be difficult to obtain a resin composition having excellent physical properties.

The graft copolymer (B) is composed of from 40 to 60 parts by weight, preferably from 45 to 60 parts by weight, of the conjugated diene rubber and from 40 to 60 parts by weight, preferably from 40 to 55 parts by weight, of the monomer mixture comprising the aromatic vinyl monomer component and the vinyl cyanide monomer component. If the proportions are outside the above ranges, it will be difficult to optimize the content of the conjugated diene rubber, the graft ratio and the specific viscosity of the graft copolymer (B), and the properties as an impact modifier tend to be inferior, whereby it will be difficult to obtain a resin composition having excellent physical properties.

In the present invention, the average particle size of graft rubber in the graft copolymer (B) within a range of from 0.2 to about 0.5 μm, is a weight average particle size as measured in a system wherein a latex of rubber starting material prior to the graft polymerization is dispersed in water at 23° C., by Coulter Nano ®-Sizer TM manufactured by Coulter Electronics Ltd., U.S.A. Likewise, the average particle size within a range of from about 0.5 to 1.0 μm is a weight average particle size as measured at 23° C. in a solution wherein a small amount of the graft copolymer (B) is dissolved in dimethylformamide and a very small amount of potassium thiocyanide is added thereto, by means of Coulter ® Counter Model TAII manufactured by Coulter Electronics LTD., U.S.A.

For the determination of the graft ratio in the present invention, the graft copolymer (B) is dispersed and dissolved in acetone at 23° C. and then separated by centrifugal separation into an acetone-insoluble component (graft rubber) and an acetone-soluble component (resinous component). The graft ratio is a ratio (%) of the weight of the dried acetone-insoluble component minus the rubber content in the graft copolymer (B) to the rubber content in the graft copolymer (B), as shown by the following equation:

$$\text{Graft ratio (\%)} = \frac{A(g) - B(g)}{B(g)} \times 100$$

where A is the weight of the acetone-insoluble component and B is the rubber content in the graft copolymer (B).

In the present invention, the specific viscosity is a specific viscosity ($\eta_{sp}$) of the resinous component of the terminal graft portions (in the monomer mixture comprising the aromatic vinyl monomer component and the vinyl cyanide monomer component), formed in the graft copolymer (B). Specifically, in the same manner as the method for measuring the above graft ratio, the acetone-soluble component obtained from the graft copolymer (B) is dried to obtain the resinous component, and the obtained resinous component is dissolved in methyl ethyl ketone to obtain a 0.1% (g/100 ml) solution. Then, the specific viscosity ($\eta_{sp}$) is measured at 25° C. by means of Ubbellohde viscometer.

The graft copolymer (B) used in the present invention can be prepared by graft-copolymerizing the monomer mixture comprising as the main components the aromatic vinyl monomer and the vinyl cyanide monomer in the presence of rubber by a conventional method such as emulsion polymerization, suspension polymerization, bulk polymerization or solution polymerization.

It is particularly preferred to employ emulsion polymerization, since it is thereby easy to control the average particle size of graft rubber in the graft copolymer (B), the graft ratio and the rubber content.

The resin mixture constituting the composition of the present invention comprises from 20 to 80% by weight, preferably from 30 to 70% by weight, of the above-mentioned polyamide resin (A) and from 20 to 80% by weight, preferably from 30 to 70% by weight, of the above-mentioned graft copolymer (B). Such resin mixture is a base resin composition for the composition of the present invention, and must be composed with the above-mentioned ranges to obtain the desired physical properties. However, it is not necessary to preliminarily mix and knead the above resin (A) and the above graft copolymer (B) prior to incorporation of the copolymer (C) or (D). The resin (A) and the graft copolymer (B) are required to be in the above-mentioned ranges only in the final form of the resin composition of the present invention. If the blend ratio is outside the above ranges, the physical properties of the resulting resin composition such as the mechanical strength, the heat resistance or the mold processability, tend to be inferior.

The copolymer (C) constituting the resin composition of the present invention comprises from 50 to 80% by weight of an aromatic vinyl monomer component, from 0.01 to 30% by weight of an α, β-unsaturated dicarboxylic anhydride monomer component, from 5 to 47% by weight of at least one monomer component selected from the group consisting of a maleimide monomer component and a vinyl cyanide monomer component and from 0 to 30% by weight of a methyl methacrylate monomer component (provided that the total amount of the monomer components is 100% by weight). The copolymer (C) is a thermoplastic hard resin having excellent heat resistance, since it contains an α, β-unsaturated dicarboxylic anhydride monomer component and an N-substituted maleimide monomer component and/or a vinyl cyanide monomer component. The copolymer (C) is added at the time of mixing the polyamide resin (A) and the graft copolymer (B) to improve the dispersibility and the compatibility of the two, whereby the properties such as the impact resistance at a low temperature and the mechanical strength will be improved.

The aromatic vinyl monomer component and the vinyl cyanide monomer component for the copolymer (C) may be the same as the respective monomer components described above as the components for the graft copolymer (B).

The proportion of the aromatic vinyl monomer component in the copolymer (C) is within a range of from 50 to 80% by weight. If the proportion is outside this range, the properties of the copolymer (C) such as the heat resistance and the compatibility with other resins, tend to change, whereby it will be difficult to obtain a resin composition having excellent physical properties.

As the α, β-unsaturated dicarboxylic anhydride monomer component as a component of the copolymer (C), maleic anhydride may be mentioned. The proportion of the α, β-unsaturated dicarboxylic anhydride monomer component in the copolymer (C) is within a range of from 0.01 to 30% by weight. The copolymer (C) containing the α, β- unsaturated dicarboxylic anhydride monomer component within this range, is capable of dispersing the polyamide resin (A) and the graft copolymer (B) with good compatibility, whereby it is possible to obtain a resin composition capable of providing very high impact resistance at a low temperature.

Specific examples of the maleimide include maleimide, N-aromatic maleimides such as N-phenylmaleimide, N-(o-methylphenyl)maleimide, N-(m-methylphenyl)maleimide, N-(p-methylphenyl)maleimide and N-naphthylmaleimide, N-cycloalkylmaleimides such as N-cyclohexylmaleimide and N-aliphatic alkylmaleimides having an alkyl group of from 1 to 10 carbon atoms. These monomers may be used alone or in combination as a mixture of two or more. Among them, a combination of N-phenylmaleimide and maleimide is particularly preferred from the viewpoint of the heat resistance of the copolymer (C).

The proportion of the total amount of the N-substituted maleimide monomer component and the vinyl cyanide monomer component in the copolymer (C) is within a range of from 5 to 47% by weight. If the proportion is outside this range, the heat resistance of the resulting resin composition or the compatibility among the resins tends to be low, such being undesirable.

The mutual ratio of the maleimide monomer component and the vinyl cyanide monomer component in the copolymer (C) may be changed depending upon the heat resistance, the compatibility and the processability of the desired resin composition.

The proportion of the methyl methacrylate monomer component in the copolymer (C) is within a range of from 0 to 30% by weight, preferably from 0 to 10% by weight. If the proportion exceeds 30% by weight, the physical properties of the resulting copolymer will change, and it will be difficult to obtain the desired resin composition.

The following two methods are available for the preparation of the copolymer (C). Either method may be employed.

(1) Method which comprises copolymerizing the components constituting the copolymer (C) as they are i.e. copolymerizing a monomer mixture comprising from 5 to 80% by weight of an aromatic vinyl monomer, from 0.01 to 30% by weight of an α, β-unsaturated dicarboxylic anhydride monomer, from 5 to 47% by weight of at least one of a maleimide monomer and a vinyl cyanide monomer, and from 0 to 30% by weight of a methyl methacrylate monomer, as the starting material for the polymerization, to obtain the copolymer (C) having the desired composition.

(2) Among the components constituting the copolymer (C), whole or the major proportion of the maleimide monomer component is replaced by a maleic anhydride component, and a monomer mixture comprising such monomer components is copolymerized. Then, the copolymer thereby obtained is subjected to polymer imidization reaction with at least one member selected from the group consisting of ammonia, aliphatic primary amines such as monoalkylamines having from 1 to 10 carbon atoms and monocycloalkylamines, and aromatic primary amines such as aniline and toluidine, to obtain a copolymer (C) having the desired composition (e.g. Japanese Unexamined Pat. Publication No. 131213/1982).

When either method (1) or (2) is employed, the actual operation may be conducted by bulk polymerization, solution polymerization, suspension polymerization and/or an emulsion polymerization. Either batch system or continuous system may be employed. Such polymerization methods and systems may optionally be combined. Further, for the treatment after completion of the copolymerization operation, various conventional operation units such as extraction, deposition, distillation, flocculation, filtration, washing, drying and pelletizing may be employed in a proper combination. The copolymer can be obtained by such aftertreatments.

The copolymer (C) prepared by such a method (1) or (2) may be used alone or in combination.

The copolymer (D) constituting the resin composition of the present invention is a thermoplastic resin comprising from 60 to 90% by weight of an aromatic vinyl monomer component, from 0 to 40% by weight of a vinyl cyanide monomer component and from 0 to 40% by weight of a methyl methacrylate component. The aromatic vinyl monomer and the vinyl cyanide monomer which are components constituting the copolymer (D) are the same as the respective vinyl monomers exemplified as the components of the monomer mixture in the graft copolymer (B).

The proportions of the components constituting the copolymer (D) are as defined above. If the proportions are outside such ranges, the properties of the copolymerized resin will change, and the compatibility with other resins to be mixed tends to deteriorate and the heat resistance or the impact resistance at a low temperature of the desired resin composition tends to be low, such being undesirable.

The method and conditions for the polymerization of the copolymer (D) may optionally be selected from emulsion polymerization, suspension polymerization, solution polymerization and bulk polymerization in accordance with the conventional production technique of e.g. an acrylonitrile-styrene copolymer (AS resin) and from a batch system and a continuous system.

Further, the copolymer (D) may be prepared at the same time as the polymerization of the graft copolymer (B) and/or the copolymer (C) in the same polymerization system, or may be prepared separately by setting up its own polymerization method and conditions.

As described above, the resin composition of the present invention is obtained by weighing and mixing 100 parts by weight of the resin mixture comprising the polyamide resin (A) and the graft copolymer (B), from 0.01 to 40 parts by weight, preferably from 1 to 20 parts by weight, of the copolymer (C) and from 0 to 15 parts by weight, preferably from 0 to 10 parts by weight, of the copolymer (D). This blend mixture may be in the form of a dry blend as it is. However, it is preferably subjected to melt-kneading for melting and mixing. If the proportions of the resins are outside the above ranges, the desired heat resistance and impact resistance at a low temperature can hardly be obtained, and it is impossible to obtain a thermoplastic resin composition having good processability.

Conventional mixing and kneading methods may be employed for blending and kneading the components constituting the resin composition of the present invention. For example, a mixture of one or more kinds of these copolymer resins in the form of powder, beads, flakes or pellets may be mixed and kneaded by an extruder such as a single-screw extruder or a twin-screw extruder, or by a kneading machine such as a Banbury mixer, a pressure kneader or a twin roll mill, to obtain a resin composition. In some cases, it is possible to employ a method wherein one or more kinds of these copolymer resins are mixed in a non-dried state after the polymerization, followed by precipitation, washing, drying and kneading.

With respect to the order for this mixing and kneading, the three or four resin or copolymer components may be simultaneously mixed and kneaded, or one or more resin or copolymer components may firstly be mixed and kneaded and a separately kneaded mixture of one or more resin or copolymer components may be added thereto, followed by kneading to obtain a desired resin composition.

If a volatile component remains in the resin composition, the heat resistance is likely to deteriorate. It is therefore preferred to conduct degassing during the mixing and kneading by means of an extruder. The resin composition thereby obtained may be used for molding as it is or after being dried. Various resin additives such as a lubricant, a releasing agent, a coloring agent, an antistatic agent, a flame retardant, a ultraviolet absorber, a light stabilizer, a heat stabilizer, a filler or a nucleating agent may be added in a suitable combination to the resin composition of the present invention in an amount and of the type not adversely affect the nature of the resin. As the filler, a fiber-like reinforcing agent such as glass fiber, metal fiber, carbon fiber or potassium titanate whiskers, talc, clay, potassium carbonate, mica, glass flake, milled fiber, metal flake and metal powder, may be mentioned. These fillers may be used alone or in combination as a mixture of two or more.

The resin composition of the present invention may be formed into shaped products such as automobile parts, electrical parts, industrial parts or goods for sport by various molding methods such as injection molding, extrusion molding or compression molding, which are useful for applications where excellent heat resistance and impact resistance at low temperatures are required.

The present invention is as described above and provides the following remarkable effects, and its value for industrial application is significant.

(1) The resin composition of the present invention obtained by blending the specific copolymer (C) containing an $\alpha, \beta$-unsubstituted dicarboxylic anhydride monomer component to the resin mixture comprising the polyamide resin (A) and the specific graft copolymer (B) as impact resistance-imparting agent, can be used as a thermoplastic resin material having extremely high impact resistance i.e. a notched Izod impact strength of at least 70 kg·cm/cm as measured at 23° C., particularly excellent notched Izod impact strength at a low temperature i.e. at least 40 kg·cm/cm as measured at −20° C., which has not been expected before.

(2) The resin composition of the present invention shows good compatibility and processability and gives a molded product having excellent heat resistance and the mechanical strength, since the graft copolymer resin (C) comprising an $\alpha, \beta$-unsaturated dicarboxylic anhydride monomer component and a maleimide monomer component and/or a vinyl cyanide monomer component is blended therein.

(3) The resin composition of the present invention contains the respective components at the optimum amounts and thus gives a molded product having the features of the respective resins, and low hygroscopicity and excellent chemical resistance.

(4) The resin composition of the present invention contains the respective components at the optimum amounts and thus has excellent resin molding processability.

(5) The resin composition of the present invention has excellent compatibility with other materials, and it is possible to obtain, for example, a glass fiber-modified resin composition having excellent heat resistance and excellent rigidity by mixing and kneading it together with a glass fiber or the like to obtain a composite.

Now, the present invention will be described in further detail with reference to Examples. However, it should be understood that the present invention is by no means restricted to such specific Examples. In the following Examples, "parts" means "parts by weight".

PREPARATION EXAMPLE (1) Preparation of qraft copolymer (B)-I

A monomer mixture (I) comprising 70 parts of styrene (hereinafter referred to simply as St), and 30 parts of acrylonitrile (hereinafter referred to simply as AN) was prepared.

Into a glass flask equipped with a stirrer, a refluxing condenser, a thermometer and an additive supply device, 270 parts (inclusive of water) of a styrene-butadiene-rubber latex (St component content in the rubber: 10% by weight, rubber solid content: 37% by weight, rubber particle size: 0.30 μm) and 100 parts of deionized water were charged, and the internal temperature was raised to 70° C. under a nitrogen stream under stirring. Then, 0.01 part of ferrous sulfate, 0.25 part of dextrose and 1 part of sodium pyrophosphate dissolved in a small amount of deionized water were added to the polymerization system.

Then, into this flask, 25 parts of an aqueous dispersion of cumene hydroperoxide (hereinafter referred to simply as CHPO) (containing 0.5 part of CHPO) was added over a period of 180 minutes, and the entire amount of the monomer mixture (I) was added over a period of 140 minutes, continuously, to initiate the polymerization at the same temperature. After 120 minutes from the initiation of the polymerization, 0.2 part of sodium dodecylbenzene sulfonate was added to the polymerization system. The graft polymerization reaction was continued at the same temperature for 210 minutes from the initiation of the polymerization.

After the completion of the graft polymerization reaction, the latex obtained was dropwise added to a 4% magnesium sulfate aqueous solution heated to 95° C. for salting out, followed by dewatering and drying to obtain a graft copolymer (B)-I in a powder form.

The graft copolymer (B)-I thus obtained was analyzed, whereby the graft ratio was found to be 68%, and the specific visocity of the resinous component was found to be 0.065.

(2) Preparation of graft copolymer (B)-II

The preparation was conducted in the same manner as in Preparation Example (1) except that in Preparation Example (1), the amount of ferrous sulfate was changed to 0.005 part. The graft copolymer (B)-II thus obtained was analyzed. The results are shown in Table 1.

(3) Preparation of qraft copolymer (B)-III

The preparation was conducted in the same manner as in Preparation Example (1) except that in Preparation Example (1), 1.1 parts of t-dodecyl mercaptan (molecular weight controlling agent) was added to the monomer mixture, and the amount of dextrose was changed to 0.8 part. The graft copolymer (B)-III thus obtained was analyzed. The results are shown in Table 1.

(4) Preparation of qraft copolymers (B)-IV to (B)-XI

Graft copolymers (B)-IV to (B)-XI were prepared in the same manner as in Preparation Example (3) except that the conditions for the preparation of the graft copolymer (B) were changed to bring the rubber average particle size of the styrene-butadiene-rubber latex and the rubber content in the graft copolymer (B) to the levels identified in Table 1. The graft copolymers (B)-IV to (B)-XI thus obtained were analyzed. The results are shown in Table 1.

TABLE 1

| Graft copolymer | Average particle size of rubber (μm) | Rubber content (wt %) | Graft ratio (%) | Specific viscosity (ηsp) |
| --- | --- | --- | --- | --- |
| (B)-I | 0.30 | 50 | 68 | 0.065 |
| (B)-II | 0.30 | 50 | 70 | 0.068 |
| (B)-III | 0.30 | 50 | 40 | 0.035 |
| (B)-IV | 0.10 | 35 | 35 | 0.070 |
| (B)-V | 0.15 | 40 | 55 | 0.050 |
| (B)-VI | 0.25 | 40 | 30 | 0.050 |
| (B)-VII | 0.20 | 35 | 100 | 0.090 |
| (B)-VIII | 0.25 | 50 | 35 | 0.055 |
| (B)-IX | 0.35 | 60 | 40 | 0.056 |
| (B)-X | 0.35 | 70 | 30 | 0.056 |
| (B)-XI | 0.38 | 55 | 60 | 0.073 |

(5) Preparation of copolymer (C)-I

Into an autoclave equipped with a condenser, stirrer and a starting material and additive supply device, 690 parts of St and 19 parts of maleic anhydride were charged, and the polymerization system was flushed with nitrogen gas. The internal temperature of the autoclave was raised to 95° C. under stirring, and the bulk polymerization reaction was initiated. Then, 100 parts of melted maleic anhydride heated to 70° C. was continuously added at a constant rate to the polymerization system at 95° C. over a period of 460 minutes after the initiation of the polymerization. After 460 minutes from the initiation of the polymerization, a viscous solution having a polymerization degree of 44% by weight was obtained.

This viscous solution was poured into a large amount of methanol to remove unreacted monomers, followed by drying to obtain a styrene-maleic anhdyride copolymer. Into an autoclave equipped with a stirrer and a starting material and additive supply device, 300 parts of the styrene-maleic anhydride copolymer thus obtained and 600 parts of xylene were charged, and the reaction system was flushed with nitrogen gas under stirring. When the reaction system became a uniform solution, the temperature was raised to 155° C., and 93 parts of aniline and 0.9 part of triethylamine were added to the autoclave to initiate the polymer imidization reaction. The polymer imidization reaction was continued at the same temperature for 240 minutes from the initiation of the reaction. The polymer solution thus obtained was poured into methanol, precipitated, washed, filtered and dried to obtain a copolymer (C)-I.

The copolymer (C)-1 thus obtained was subjected to NMR analysis, whereby the composition was found to be 57.6% by weight of styrene component, 41.6% by weight of an N-phenylmaleimide component and 0.8% by weight of a maleic anhydride component.

(6) Preparation of a mixture of copolymer (C)-II and copolymer (D)-I

Into an autoclave equipped with a condenser, a stirrer and a starting material and additive supply device, 690 parts of St and 19 parts of maleic anhydride were charged, and the polymerization system was flushed with nitrogen gas. The internal temperature of the polymerization reactor was raised to 95° C. under stirring, and the bulk polymerization reaction was initiated. Then, 100 parts of melted maleic anhydride heated to 70° C. was continuously added at a constant rate to the polymerization system at 95° C. over a period of 460 minutes after the initiation of the polymerization. After 460 minutes from the initiation of the polymerization, a viscous solution having a polymerization degree of 44% by weight was obtained.

To this polymerization system, 210 parts of AN was further continuously added during the period from 460 minutes to 480 minutes from the initiation of the polymerization. The temperature of the polymerization system was lowered from 95° C. to 90° C., and the bulk polymerization reaction was conducted for further 20 minutes, whereupon no substantial maleic anhydride remained in the unreacted monomers, thus showing that maleic anhydride was consumed by the polymerization reaction.

To this polymerization system, 700 parts of an aqueous solution containing 0.03 part of a polyvinyl alcohol-type suspending agent and 0.03 part of an acrylic acid-octyl acrylate copolymer-type suspending agent and 2 parts of di-t-butylperoxide were added, and the polymerization system was changed from the bulk polymerization system to a suspension polymerization system. This suspension polymerization system was heated to 110° C., the unreacted monomers were removed by stripping at the same temperature for 120 minutes, and the polymerization reaction was continued. Then, 80 parts of AN was added thereto, and the temperature of the suspension polymerization system was raised from 110° C. to 150° C. over a period of 60 minutes. While maintaining the temperature of the suspension polymerization system at 150° C., stripping was conducted again for 120 minutes.

After the completion of the stripping, the suspension system was heated to 155° C., and 90 parts of aniline and 10 parts of 25 wt% aqueous ammonia were added thereto. The suspension system was stirred at the same temperature for 120 minutes to conduct the polymer imidization reaction. The suspension system was cooled, followed by filtration, washing with water and drying to obtain a copolymer in the form of beads. The beads copolymer was pelletized by a single-screw extruder.

The pellets were analyzed and found to be a mixture of a copolymer (C)-II comprising 58.8% by weight of a styrene component, 38.2% by weight of an N-phenyl-maleimide component, 1.4% by weight of a maleimide component and 1.6% by weight of a maleic anhydride component and a copolymer (D)-I comprising 73.8% by weight of a styrene component and 26.2% by weight of an acrylonitrile component, the composition being 76% by weight of the copolymer (C)-II and 24% by weight of the copolymer (D)-I.

(7) Preparation of copolymer (C)-III

Into a glass flask equipped with a condenser and a stirrer, 67 parts of St, 29 parts of AN and 200 parts of methyl ethyl ketone were charged, and the temperature was raised to 77° C. while supplying nitrogen gas.

On the other hand, a solution (solution A) comprising 10 parts of methyl ethyl ketone, 3 parts of AN, 0.5 part of maleic anhydride and 0.5 part of azobisisobutyronitrile, was prepared. This solution A was equally divided into five portions.

When the polymerization reaction system reached 77° C., one portion of the solution A divided equally into five portions, was added thereto at once to initiate the polymerization. While maintaining the system at 77° C., one portion of the solution A divided equally into five portions was added at once each time after 0.5, 1.0, 2.0 and 3.0 hours after the initiation of the polymerization. The polymerization was completed after 5 hours from the initiation of the polymerization, and the reaction mixture was cooled. After cooling, the reaction mixture was poured into a large amount of methanol for precipitation, followed by drying to obtain a copolymer (C)-III. The conversion in the polymerization was 60%.

The copolymer (C)-III thus obtained was subjected to analysis by GPC, whereby the weight average molecular weight was 70,000 as calculated as polystyrene. From the results of the liquid chromatography analysis, acrylonitrile was 30% by weight. The content of maleic anhydride was calculated to be 0.83% by weight from the conversion in the polymerization.

(8) Preparation of copolymer (C)-IV

Into a glass flask equipped with a condenser and a stirrer, 67 parts of St, 29 parts of AN and 200 parts of methyl ethyl ketone were charged, and the temperature was raised to 77° C. while supplying nitrogen gas.

On the other hand, a solution (solution A) comprising 10 parts of methyl ethyl ketone, 3 parts of AN, 0.5 part of maleic anhydride and 0.3 part of azobisisobutyronitrile, was prepared. This solution A was divided into six portions.

When the polymerization reaction system reached 72° C., one portion of the solution A divided equally into six portions, was added thereto at once to initiate the polymerization. While maintaining the system at 72° C., one portion of the solution A divided equally into six portions was added at once each time after 1.0, 2.0, 3.0, 4.0 and 5.0 hours from the initiation of the polymerization. The polymerization was completed after 8 hours from the initiation of the polymerization, and the reaction mixture was cooled. After cooling, the reaction mixture was poured into a large amount of methanol for precipitation, followed by drying to obtain a copolymer (C)-IV. The conversion in the polymerization was 53%.

The copolymer (C)-IV thus obtained was analyzed by GPC, whereby the weight average molecular weight was 110,000 as calculated as polystyrene. From the results of the liquid chromatography analysis, acrylonitrile was 30% by weight. The content of maleic anhydride was calculated to be 0.94% by weight from the conversion in the polymerization.

EXAMPLES 1 to 13 and COMPARATIVE EXAMPLES 1 to 18

Nylon 6 (NOVAMID ® 1010, manufactured by Mitsubishi Chemical Industries Limited) as the polyamide resin (A), the rubber-modified styrene graft copolymer (B), the copolymer (C) and the copolymer (D), which were prepared by the methods disclosed in the above Preparation Examples, were weighed in the proportions (parts) as identified in Table 2 or 4, and they were mixed in a tumbler. The mixture thereby obtained was kneaded by a single-screw or twin-screw extruder equipped with a vent while removing a volatile component, to obtain pellets of the resin composition.

The pellets of this resin composition were formed by injection molding into test pieces for the measurement of the physical properties. With respect to the molded test pieces, the tensile strength, the Izod impact strength (notched) measured at <23° C. and −20° C. and the melt flow rate were measured, respectively, in accordance with the method as identified in Table 2 or 4. The results are shown in Tables 2 and 4.

Further, with respect to the molded test pieces of Example 1 and Comparative Example 1, the notched Izod impact strength was measured at various temperatures ranging from −40° C. to +23° C. The results are shown in Table 3 and FIG. 1.

TABLE 2

| | | | Examples | | | | | | | |
|---|---|---|---|---|---|---|---|---|---|---|
| | | | 1 | 2 | 3 | 4 | 5 | 6 | 7 | 8 |
| Proportions (parts) | Polyamide (A) | | 50 | 40 | 60 | 50 | 50 | 50 | 50 | 50 |
| | Graft copolymer | (B)-I | 50 | 60 | 40 | 50 | 50 | — | — | — |
| | | (B)-II | — | — | — | — | — | 50 | 50 | — |
| | | (B)-III | — | — | — | — | — | — | — | — |
| | | (B)-IV | — | — | — | — | — | — | — | — |
| | | (B)-V | — | — | — | — | — | — | — | — |
| | | (B)-VI | — | — | — | — | — | — | — | — |
| | | (B)-VII | — | — | — | — | — | — | — | — |
| | | (B)-VIII | — | — | — | — | — | — | — | — |
| | | (B)-IX | — | — | — | — | — | — | — | 50 |
| | | (B)-X | — | — | — | — | — | — | — | — |
| | Copolymer | (C)-I | — | — | — | — | — | — | 5.0 | — |
| | | (C)-II | 8.3 | 8.3 | 8.3 | 16.6 | 4.2 | 8.3 | — | 8.3 |
| | Copolymer | (D)-I | 2.8 | 2.8 | 2.8 | 5.6 | 1.4 | 2.8 | — | 2.8 |
| Physical properties | Tensile strength *1 (kg/cm²) | | 474 | 443 | 525 | 522 | 520 | 467 | 472 | 461 |
| | Izod impact strength *2 (notched) (kg·cm/cm) | 23° C. | 88 | 75 | 88 | 73 | 89 | 87 | 89 | 89 |
| | | −20° C. | 66 | 44 | 63 | 63 | 61 | 67 | 63 | 73 |
| | Load defection temp. *3 (°C.) | | 75 | 71 | 68 | 86 | 73 | 75 | 71 | 74 |
| | Melt flow rate *4 (g/10 min) 260° C. | | 45 | 38 | 61 | 35 | 63 | 48 | 55 | 39 |

| | | | Comparative Examples | | | | | | | | | |
|---|---|---|---|---|---|---|---|---|---|---|---|---|
| | | | 1 | 2 | 3 | 4 | 5 | 6 | 7 | 8 | 9 | 10 |
| Proportions (parts) | Polyamide (A) | | 50 | 50 | 50 | 50 | 50 | 50 | 10 | 50 | 50 | 50 |
| | Graft copolymer | (B)-I | — | — | — | — | — | — | 90 | 50 | 50 | — |
| | | (B)-II | — | — | — | — | — | — | — | — | — | — |
| | | (B)-III | 50 | — | — | — | — | — | — | — | — | — |
| | | (B)-IV | — | 50 | — | — | — | — | — | — | — | — |
| | | (B)-V | — | — | 50 | — | — | — | — | — | — | — |
| | | (B)-VI | — | — | — | 50 | — | — | — | — | — | — |
| | | (B)-VII | — | — | — | — | 50 | — | — | — | — | — |
| | | (B)-VIII | — | — | — | — | — | 50 | — | — | — | — |
| | | (B)-IX | — | — | — | — | — | — | — | — | — | — |
| | | (B)-X | — | — | — | — | — | — | — | — | — | 50 |
| | Copolymer | (C)-I | — | — | — | — | — | — | — | — | — | — |
| | | (C)-II | 8.3 | 8.3 | 8.3 | 8.3 | 8.3 | 8.3 | 8.3 | 0 | 44.0 | 8.3 |
| | Copolymer | (D)-I | 2.8 | 2.8 | 2.8 | 2.8 | 2.8 | 2.8 | 2.8 | 0 | 14.3 | 2.8 |
| Physical properties | Tensile strength *1 (kg/cm²) | | 465 | 391 | 378 | 477 | 353 | 458 | 207 | 305 | 429 | 344 |
| | Izod impact strength *2 (notched) (kg·cm/cm) | 23° C. | 89 | 27 | 33 | 74 | 25 | 85 | 35 | 19 | 41 | 92 |
| | | −20° C. | 17 | 4 | 5 | 15 | 6 | 29 | 7 | 3 | 8 | 25 |
| | Load defection temp. *3 (°C.) | | 73 | 71 | 75 | 73 | 74 | 73 | 75 | 67 | 99 | 71 |
| | Melt flow rate *4 (g/10 min) 260° C. | | 61 | 44 | 57 | 59 | 41 | 49 | 0.1 | 52 | 8 | 37 |

TABLE 3

| | Izod impact strength (notched) (kg·cm/cm) | | | | | | |
|---|---|---|---|---|---|---|---|
| | 23° C. | 10° C. | 0° C. | −10° C. | −20° C. | −30° C. | −40° C. |
| Example 1 | 88 | 80 | 75 | 75 | 66 | 22 | 17 |
| Comparative Example 1 | 89 | 69 | 50 | 21 | 17 | 10 | 7 |

TABLE 4

| | | Examples | | | | | | | | | | | |
|---|---|---|---|---|---|---|---|---|---|---|---|---|---|
| | | 9 | 10 | 11 | 12 | 13 | 11 | 12 | 13 | 14 | 15 | 16 | 17 | 18 |
| Polyamide resin (A) | | 57 | 54 | 57 | 54 | 52 | 57 | 57 | 57 | 57 | 57 | 57 | 10 | 50 |
| Graft copolymer | (B)-XI | 40 | 40 | 40 | 40 | 40 | — | — | — | — | — | — | 87 | 50 |
| | (B)-III | — | — | — | — | — | 40 | — | — | — | — | — | — | — |
| | (B)-IV | — | — | — | — | — | — | 40 | — | — | — | — | — | — |
| | (B)-V | — | — | — | — | — | — | — | 40 | — | — | — | — | — |
| | (B)-VI | — | — | — | — | — | — | — | — | 40 | — | — | — | — |
| | (B)-VII | — | — | — | — | — | — | — | — | — | 40 | — | — | — |

TABLE 4-continued

| | | Examples | | | | | | | | | | | | |
|---|---|---|---|---|---|---|---|---|---|---|---|---|---|---|
| | | 9 | 10 | 11 | 12 | 13 | 11 | 12 | 13 | 14 | 15 | 16 | 17 | 18 |
| Copolymer | (B)-VIII | — | — | — | — | — | — | — | — | — | — | 40 | — | — |
| | (C)-III | 3 | 6 | — | — | — | — | — | — | — | — | — | — | — |
| | (C)-IV | — | — | 3 | 6 | 3 | 3 | 3 | 3 | 3 | 3 | 3 | 3 | — |
| Copolymer | (D)-II | — | — | — | — | 5 | — | — | — | — | — | — | — | — |
| Tensile strength *1 (kg/cm²) | | 391 | 404 | 378 | 399 | 451 | 413 | 377 | 389 | 435 | 427 | 433 | 203 | 300 |
| Izod impact strength *2 (notched) (kg·cm/cm) | 23° C. | 87 | 89 | 91 | 90 | 79 | 87 | 25 | 30 | 71 | 18 | 87 | 42 | 20 |
| | −20° C. | 48 | 77 | 77 | 77 | 43 | 5 | 6 | 9 | 18 | 8 | 21 | 8 | 5 |
| Melt flow rate *4 (g/10 min) 260° C. | | 30 | 33 | 29 | 34 | 39 | 65 | 47 | 55 | 54 | 43 | 48 | 0.1 | 50 |

Copolymer (D)-II is an acrylonitrile-styrene resin having AN content of 30% by weight and a specific viscosity of 0.110.
Notes:
*1: Measured in accordance with JIS K7113.
*2: Measured at 23° C. and −20° C. in accordance with JIS K7110 (notched).
*3: Measured in accordance with JIS K7207 method A (no annealing).
*4: Measured in accordance with JIS K7210 method B (load: 10 kgf, temperature: 260° C.).

Figure 1:
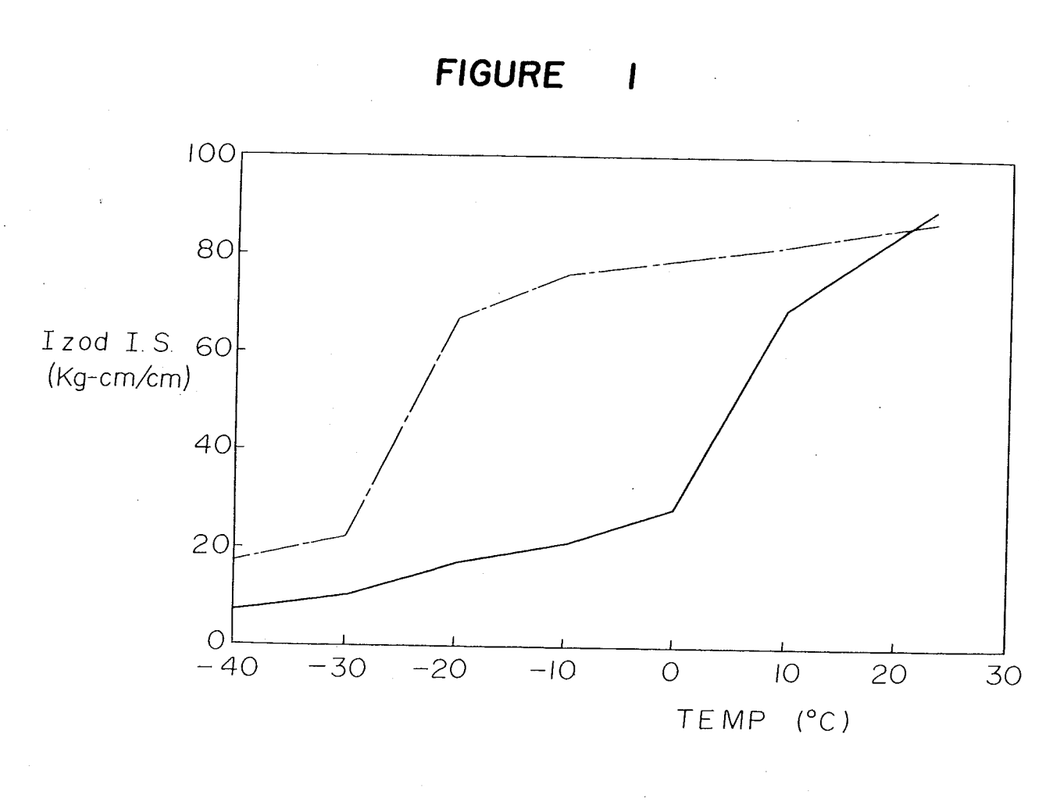
FIG. 1 shows the comparison in the low temperature impact resistance between the resin composition of Example 1 and the resin composition of Comparative Example 1.

The following are evident form Tables 1 to 4 and FIG. 1.

(1) The resin composition of the present invention has excellent notched Izod impact strength (at least 40 kg·cm/cm) at a low temperature (−20° C.) since the composition of the blended graft copolymer (B) is optimized (see Examples 1 to 8 in Table 2 and Examples 9 to 13 in Table 4).

On the other hand, with the resin composition having a graft copolymer (B) falling outside the scope of the present invention incorporated, the notched Izod impact strength at a low temperature (−20° C.) is low (see Comparative Examples 1 to 6 and 10 in Table 2 and Comparative Examples 11 to 16 in Table 4).

(2) The resin composition of the present invention has very high notched Izod impact strength at room temperature and at a low temperature (−20° C.) which has never been expected before (see Examples 1 to 13), since it contains a proper amount of the copolymer (C) having the optimized composition (in Examples 1 to 8, copolymer (C) comprising styrene, N-phenylmaleimide, maleimide and maleic anhydride, and in Examples 9 to 13, copolymer (C) comprising styrene, acrylonitrile and maleic anhydride).

On the other hand, the one containing no copolymer (C) (see Comparative Examples 8 and 18) and the one containing the copolymer (C) excessively (see Comparative Example 9) have low notched Izod impact strength.

(3) The resin composition of the present invention having the resective resins incorporated in the optimum amounts, is very well balanced in the mechanical strength shown by the tensile strength, the Izod impact strength at 23° C. and at −20° C., the load-deflection temperature and the melt flow rate, the heat resistance and the molding processability (see Examples 1 to 13).

Whereas, the resin compositions with the proportions outside the ranges of the present invention, are ill-balanced in the above-mentioned properties, and have drawbacks that they are inferior in at least one of the physical properties (see Comparative Examples 1 to 18).

What is claimed is:

1. An impact resistant thermoplastic resin composition having a notched Izod impact strength of at least 70 kg-cm/cm as measured at 23° C. and a notched Izod impact strength of at least 40 kg·cm/cm as measured at −20°C. which comprises:

100 parts by weight of a resin mixture comprising from 20 to 80% by weight of a polyamide resin (A) and from 20 to 80% by weight of a graft copolymer (B) composed of from 40 to 60 parts by weight of a conjugated diene rubber and from 40 to 60 parts by weight of a monomer mixture comprising from 60 to 80% by weight of an aromatic vinyl monomer component and from 20 to 40% by weight of a vinyl cyanide monomer component (provided that the total amount of said monomer mixture is 100% by weight) wherein the average particle size of conjugated diene rubber is from 0.2 to 1.0 μm, the graft ratio is from 40 to 80%, and the specific viscosity of a resinous component composed of said monomer components is from 0.05 to 0.10;

from 0.01 to 40 parts by weight of a copolymer (C) comprising from 50 to 80% by weight of an aromatic vinyl monomer component, from 0.01 to 30% by weight of an α,β-unsaturated dicarboxylic anhydride monomer component, from 5 to 47% by weight of at least one monomer component selected from the group consisting of maleimide, an N-substituted maleimide monomer component and a vinyl cyanide monomer component, and from 0 to 30% by weight of a methyl methacrylate monomer component (provided that the total amount of the monomer components is 100% by weight); and from 0 to 15 parts by weight of a copolymer (D) comprising from 60 to 90% by weight of an aromatic vinyl monomer component, from 0 to 40% by weight of a vinyl cyanide monomer component and from 0 to 40% by weight of a methyl methacrylate monomer component (provided that the total amount of the monomer components is 100% by weight).

2. The resin composition according to claim 1, wherein the polyamide resin (A) is nylon 6, nylon 66 or a copolymer nylon, or a mixture thereof.

3. The resin composition according to claim 1, wherein the conjugated diene rubber is a rubbery polymer containing at least 50% by weight of a conjugated diene monomer component and having a glass transition temperature of not higher than 0° C.

4. The resin composition according to claim 1, wherein the conjugated diene rubber is butadiene rubber, styrene-butadiene rubber, acrylonitrile-butadiene rubber or isoprene rubber.

5. The resin composition according to claim 1, wherein the aromatic vinyl monomer component constituting each of the copolymers (B), (C) and (D) is styrene, an alkylstyrene, vinyl naphthalene, or a mixture thereof.

6. The resin composition according to claim 1, wherein the vinyl cyanide monomer component constituting each of the copolymers (B), (C) and (D) is acrylonitrile, methacrylonitrile, α-chloroacrylonitrile, or a mixture thereof.

7. The resin composition according to claim 1, wherein the α, β-unsaturated dicarboxylic anhydride monomer component is maleic anhydride.

8. The resin composition according to claim 1, wherein the monomer component of copolymer (C) is maleimide, an N-aromatic maleimide, and N-cycloalkylmaleimide, and N-$C_1$-$C_{10}$ alkylmaleimide, or a mixture thereof.

9. The resin composition according to claim 1, wherein the monomer component of copolymer (C) is a mixture of N-phenylmaleimide and maleimide.

10. The resin composition according to claim 1, which comprises 100 parts by weight of said resin mixture, from 1 to 20 parts by weight of the copolymer (C) and from 0 to 10 parts by weight of the copolymer (D).

11. The resin composition according to claim 1, wherein said graft copolymer (B) comprises from 45 to 60 parts by weight of the conjugated diene rubber and from 40 to 55 parts by weight of the monomer mixture comprising the aromatic vinyl monomer component and the vinyl cyanide monomer component.

12. The resin composition according to claim 1, wherein the resin mixture comprises from 30 to 70% by weight of the polyamide resin (A) and from 30 to 70% by weight of the graft copolymer (B).

* * * * *